United States Patent [19]
Gnadt

[11] Patent Number: 5,754,114
[45] Date of Patent: May 19, 1998

[54] SAFETY GROUND DETECTOR

[75] Inventor: Dennis L. Gnadt, Torrance, Calif.

[73] Assignee: Delco Electronics Corporation, Kokomo, Ind.

[21] Appl. No.: 703,280

[22] Filed: Aug. 26, 1996

[51] Int. Cl.⁶ .................................. G08B 21/00
[52] U.S. Cl. .................. 340/649; 340/652; 361/42; 361/47
[58] Field of Search ..................... 340/649, 650, 340/657, 673, 676, 693, 652; 361/42, 44, 45, 47; 324/508, 509, 510, 511

[56] References Cited

U.S. PATENT DOCUMENTS

| | | | |
|---|---|---|---|
| 3,737,765 | 6/1973 | Lee et al. | 324/510 |
| 4,012,727 | 3/1977 | Grossi et al. | 340/693 |
| 4,228,475 | 10/1980 | Sherwood | 361/47 |
| 4,321,643 | 3/1982 | Vernier | 340/652 |
| 4,638,244 | 1/1987 | Howell | 324/510 |
| 5,166,852 | 11/1992 | Sano | 340/649 |
| 5,576,695 | 11/1996 | Minger et al. | 340/649 |

*Primary Examiner*—Brent A. Swarthout
*Assistant Examiner*—Van T. Trieu
*Attorney, Agent, or Firm*—Mark A. Navarre

[57] ABSTRACT

Ground detection apparatus that automatically detects continuity of a safety ground of a piece of equipment. The ground detection apparatus includes test relay circuitry for determining if a ground connection is open. Comparison logic circuitry is used to generate a fault signal if the ground connection is open and to prevent the electrical equipment from being energized. Delay circuitry is used to stabilize input voltage measurements, and to test the lines for a desired time period. Latching circuitry is used to latch the fault condition, and to ensure that all delays have elapsed and no fault condition exists before the electrical equipment is energized. Optionally, the latching circuitry may be used to prevent latching in a "brownout" condition. If the equipment safety ground is not present, power is not supplied to the equipment. This prevents possible shock to a user caused by ungrounded equipment. The ground detection apparatus also provides an audible alert, and may also provide a light indication, that indicates that a ground connection is not present.

9 Claims, 4 Drawing Sheets

SAFETY GROUND DETECTOR

BACKGROUND

The present invention relates generally to ground fault detectors, and more particularly, to a safety ground detector that automatically detects ground continuity between a device and earth ground, and which may be used with inductive or conductive charging systems, and the like.

The assignee of the present invention designs and manufactures inductive charging systems for use in charging batteries of electric vehicles. The charging system employs a charge port into which an inductive coupler is inserted to charge the electric vehicle. The charging systems operate at relatively high charging levels, and it is important to monitor whether the system has continuity between its safety ground and earth ground. It has been determined that there is a need for a ground fault detector that provides this ability.

There presently exist small, hand-held devices that can be plugged into a wall outlet to test for proper wiring and ground continuity. These devices have lights that are lit to indicate the wiring status. While such devices are regularly used by electricians during new home construction, for example, such a device that automatically tests for ground faults is not currently available. It is not believed that there is any device built into equipment that automatically checks for a ground connection to a service panel and which prevents powering up of a device if there is an open ground condition.

Accordingly, it is an objective of the present invention to provide for a safety ground detector that automatically detects ground continuity between a device and earth ground. It is another objective of the present invention to provide for a safety ground detector for use with an inductive charging system that prevents powering up of the system if there is an open ground condition.

SUMMARY OF THE INVENTION

To meet the above and other objectives, the present invention is ground detection apparatus (or ground detector) that automatically detects continuity of a safety ground of a piece of equipment when the safety ground detector is coupled between the piece of equipment and an earth ground located in service panel wiring that is used to power the equipment. If the equipment safety ground is not present, in that there is a ground fault, power is not passed to the equipment containing or using the safety ground detector. This prevents possible shock to a user caused by an ungrounded piece of equipment. The safety ground detector also provides an audible alert, and may also provide a light indication, that indicates that a ground connection is not present.

More particularly, the ground detection apparatus includes test relay circuitry for determining if a ground connection is open. Comparison logic circuitry is used to generate a fault signal if the ground connection is open and to prevent the electrical equipment from being energized. Delay circuitry is used to stabilize input voltage measurements, and to test the lines for a desired time period. Latching circuitry is used to latch the fault condition, and to ensure that all delays have elapsed and no fault condition exists before the electrical equipment is energized. Optionally, the latching circuitry may be used to prevent latching in a "brownout" condition.

The present invention prevents possible electrical shock from a piece of equipment that is either intentionally or unintentionally plugged into an ungrounded circuit. If a piece of equipment requires grounding because it incorporates EMI filtering, as an example, then the present invention may be used to detect a connection to safety ground. An EMI filter in electrical equipment produces leakage current to chassis ground which needs to be grounded.

The present invention may be used with 120 VAC, 208 VAC and 240 VAC circuits to automatically check for ground presence before power is connected to the equipment to be used. The present invention also provides an audible warning (and/or a light indication) if the equipment is plugged into an ungrounded outlet. For 120 VAC circuits, the present invention also detects reversal of neutral and hot wires where the electrical service had not been wired to electrical code. When the present invention is built into equipment requiring a ground connection, operating personnel are protected from shock in the event of an open ground condition. The use of a small test relay allows pre-test of the ground to prevent a short duration shock due to filter capacitor ground currents in the powered-up equipment.

The present invention was developed for use in battery chargers of electric vehicles but may also be used with any type of equipment that requires an earth ground connection to prevent electrical shock. The present invention provides an additional degree of protection for users of high voltage inductive charging systems, and the like.

BRIEF DESCRIPTION OF THE DRAWINGS

The various features and advantages of the present invention may be more readily understood with reference to the following detailed description taken in conjunction with the accompanying drawings, wherein like reference numerals designate like structural elements, and in which.

DETAILED DESCRIPTION

Figure 1:
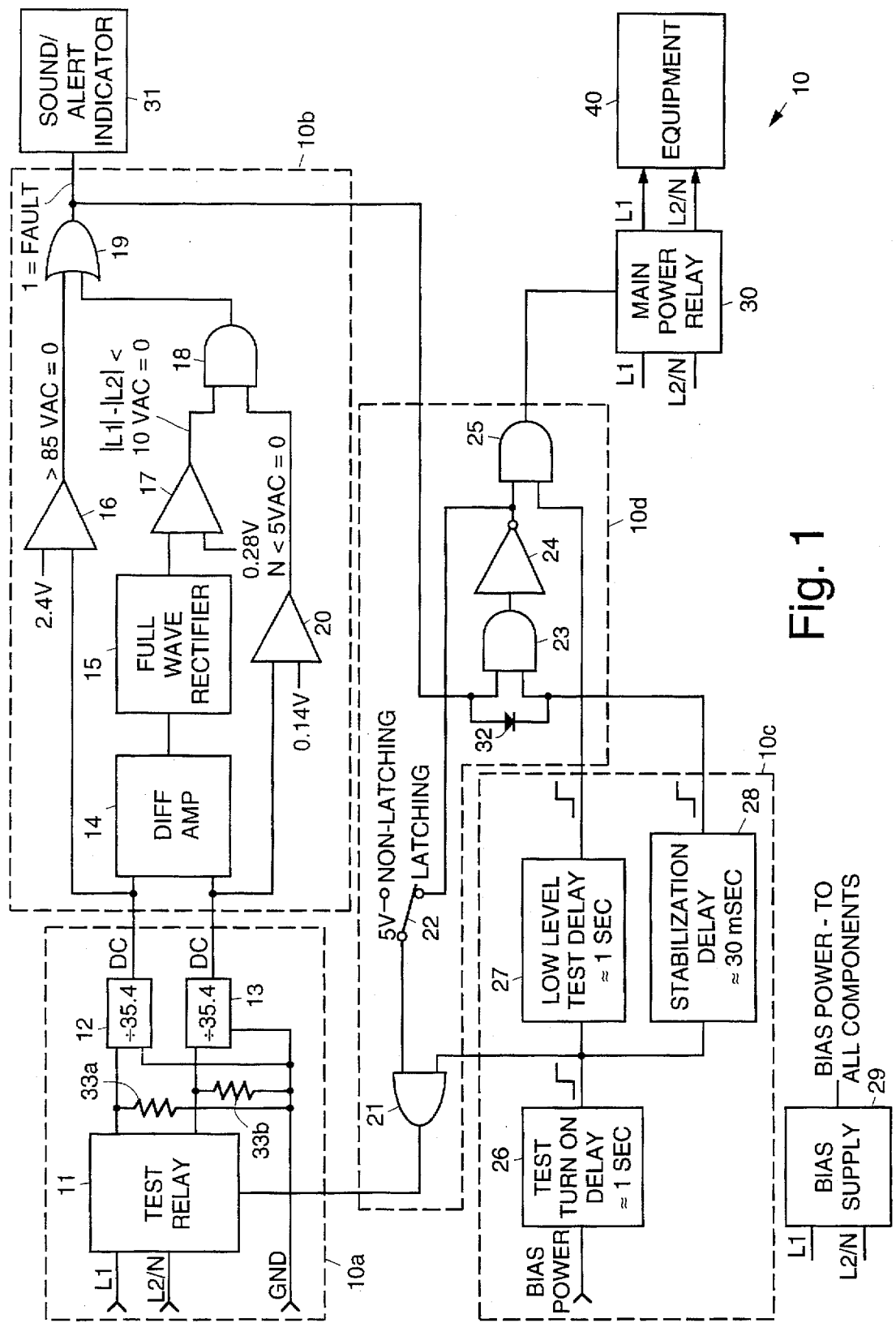
FIG. 1 shows a block diagram of a safety ground detector in accordance with the principles of the present invention.

Referring to the drawing figures, FIG. 1 shows a block diagram of a safety ground detector 10 in accordance with the principles of the present invention that is used with a piece of electrical equipment 40. The safety ground detector 10 comprises a bias supply 29 for supplying power to all circuitry of the detector 10. Test relay circuitry 10a is used to determine if a ground connection is open. Comparison logic circuitry 10b is used to generate a fault signal if the ground connection is open and to prevent the electrical equipment 40 from being energized. Delay circuitry 10c is used to stabilize input voltage measurements, and to test the lines for a desired time period. Latching circuitry 10d is used to latch the fault condition, and may include an optional switch 22 to prevent latching in a "brownout" condition. The latching circuitry 10d is also used to ensure that all delays have elapsed and no fault condition exists before the electrical equipment 40 is energized.

The test relay circuitry 10a includes a test relay 11 that receives line 1 (L1) and line 2/N (L2/N) input signals, where L1 corresponds to a hot input, L2/N corresponds to a hot input (for 208 or 240 VAC) or neutral input (for 120 VAC). Outputs of the test relay 11 are coupled to first and second dividers 12, 13. A ground connection is made by way of unequal high value resistors 33a, 33b to first inputs of the dividers 12, 13, while the ground connection is directly made to second inputs of the dividers 12, 13. Outputs of the dividers 12, 13 are coupled to inputs of the comparison logic circuitry 10b.

The comparison logic circuitry 10b comprises a number of logic circuits that generate a fault signal if the ground connection is open and prevent energizing of the electrical equipment 40 More particularly, the output of the first divider 12 is coupled to one input of a first comparator 16 whose other input is coupled to a 2.4 volt voltage source. The output of the second divider 13 is coupled to one input of a second comparator 20 whose other input is coupled to a 0.14 volt voltage source. The output of the differential amplifier 14 is coupled by way of a full wave rectifier 15 to one input of a third comparator 17 whose other input is coupled to a 0.28 volt voltage source. The outputs of the second and third comparators 20, 17 are coupled to a first AND gate 18 whose output is coupled to one input of an OR gate 19. The other input of the OR gate 19 is coupled to the output of the first comparator 16. The output of the OR gate is coupled to a sound alert and/or light indicator circuit 31, and is coupled to a fourth AND gate 23 of the latching circuit 10d.

The delay circuitry 10c includes a test turn on delay circuit 26, a low level test delay circuit 27, and a stabilization delay circuit 28. The latching circuitry 10d includes a plurality of gates 21, 23, 25 and the optional switch 22, which latching circuitry 10d latches a fault condition, prevents latching in a "brownout" condition, and ensures that the delays have elapsed and no fault condition exists before the electrical equipment 40 is energized.

More particularly, bias power is input to the test turn on delay circuit 26 whose output is coupled to both the low level test delay circuit 27 and the stabilization delay circuit 28. The output of the test turn on delay circuit 26 is also coupled to one input of a second AND gate 21 whose output is coupled to the test relay 11 and is used to activate it. The output of the low level test delay circuit 27 is coupled to a first input of a third AND gate 25. The output of the stabilization delay circuit 28 is coupled to one input of a fourth AND gate 23. A second input of the fourth AND gate 23 is coupled to the output of the OR gate 19. A clamping diode 32 is coupled across the inputs of the fourth AND gate 23 to prevent activation of the sound alert and/or light indicator circuit 31 at turn on.

The output of the fourth AND gate 23 is coupled through an inverter 24 to a second input of the third AND gate 25 whose output is coupled to a main power relay 30 and which is used to trigger it. The line 1 (L1) and line 2/N (L2/N) input signals are switched through the main power relay 30. The output of the inverter 24 is coupled to the input of the switch 22 which couples the output of the inverter 24 to the second AND gate 21 when the latching mode is selected by the switch 22. The switch 22 is coupled to a second input of the second AND gate 21.

In operation, when the safety ground detector 10 is plugged into an outlet, the bias supply 29 applies power to all circuitry. The test relay turn on delay circuit 26 delays energizing test relay 11 for approximately one second to allow time to remove body contact with the equipment. The test relay 11 is then energized to apply power across the unequal high value resistors 33a, 33b. If the ground connection is open, the resistors 33a, 33b cause the ground voltage to shift so that the neutral to ground voltage (in the case of 120V AC service) is much greater than zero volts (neutral and ground should be approximately equal). In the case of 208V or 240V AC with an open ground, the resistors cause the voltage of line 1 (L1) and line 2 (L2) to not be equal within normal tolerance. The dividers 12, 13 divide the high voltage for measurement by low voltage circuits that follow them. The first comparator 16 checks for adequate line voltage (>85 VAC) to prevent drawing a lot of current through a poor power connection. The second comparator 20 checks for neutral to ground voltage of less than 5 VAC (which may be set higher to allow for more neutral line drop) for 120V AC operation and verify line and neutral are connected properly. The differential amplifier 14 and full wave rectifier 15 compare line 1 and line 2 for equality within normal limits and rectify the difference between the absolute values for comparison by the first comparator 17 for 208V and 240V AC operation.

The first, third and second comparators 16, 17, 20 output a logic "0" when satisfied. The first AND gate 18 requires a logic "0" from either comparator 17, 20 in normal operation to output a logic "0" to the OR gate 19 which also tests the comparator 16 for a logic "0". An open ground causes both comparators 17, 20 to output a logic "1" which is passed through the OR gate 19 as a fault which causes a sound alert and prevents the main power relay 30 from energizing via the fourth AND gate 23, the inverter 24 and the third AND gate 25. The fault condition is latched by de-energizing the test relay 11 via the fourth and second AND gates 23, 21 and inverter 24, and then causing the first comparator 16 output to go to a logic "1" fault condition output.

If desired, the switch 22 may be set to 5 volts (non-latching) to prevent latching in a "brownout" condition. In that case, the test relay 11 stays energized once power is applied so that the first comparator 16 output goes low again when the "brownout" condition has passed. The stabilization delay circuit 28 allows the input voltage measurements to stabilize for approximately 30 milliseconds by locking out an initial fault from going through the AND gate 23. The diode 32 (D1) keeps the sound alert from sounding during the initial power on period. The initial low state of the stabilization delay circuit 28 also allows energizing of the test relay 11 and prevents the main relay 30 from energizing along with a low output signal (logic "0") from the low level test delay circuit 27. The low level test delay circuit 27 ensures the input AC lines are tested for approximately 1 second before allowing the main relay 30 to energize by holding its output low for approximately 1 second after the test turn on delay circuit 26 goes high. The AND gate 25 requires that all delays have elapsed and no fault condition exists before the main power relay 30 is energized. If a fault occurs after the main relay 30 is closed, the fault will de-energize main relay 30 and latch up as before.

Figure 2:
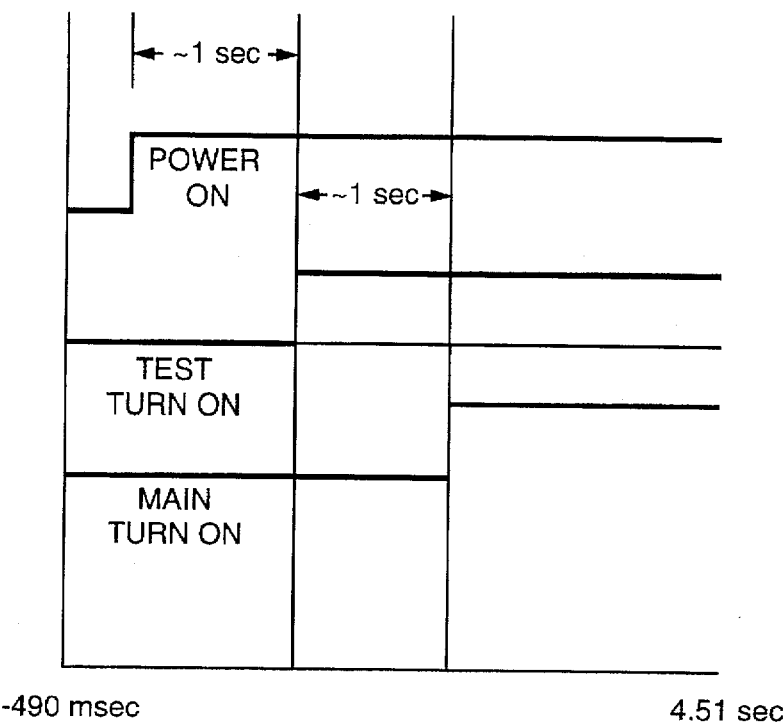
FIG. 2 shows a normal power on sequence (no fault) for the safety ground detector of FIG. 1.
Figure 3:
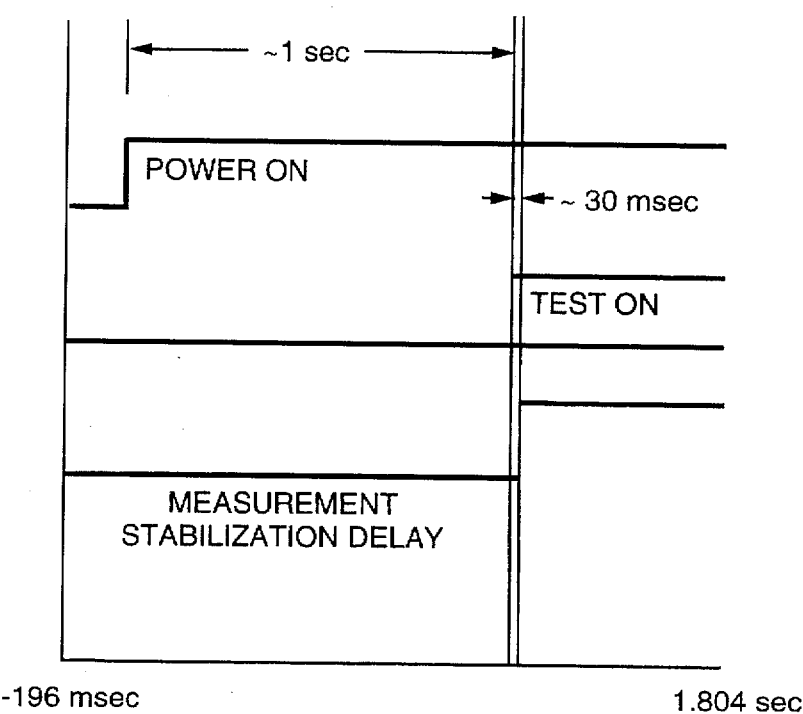
FIG. 3 shows measurement stabilization delay and test relay turn-on delay for the safety ground detector of FIG. 1.
Figure 4:
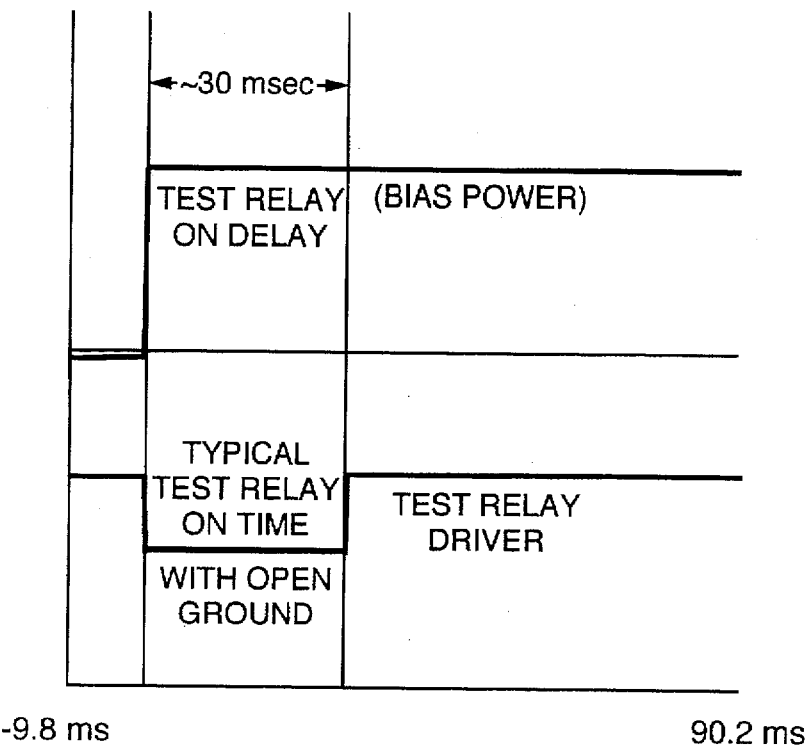
FIG. 4 shows turn on of the safety ground detector of FIG. 1 with an open ground condition, and wherein test relay is on approximately 30 milliseconds and shuts off due to a fault.
Figure 5:
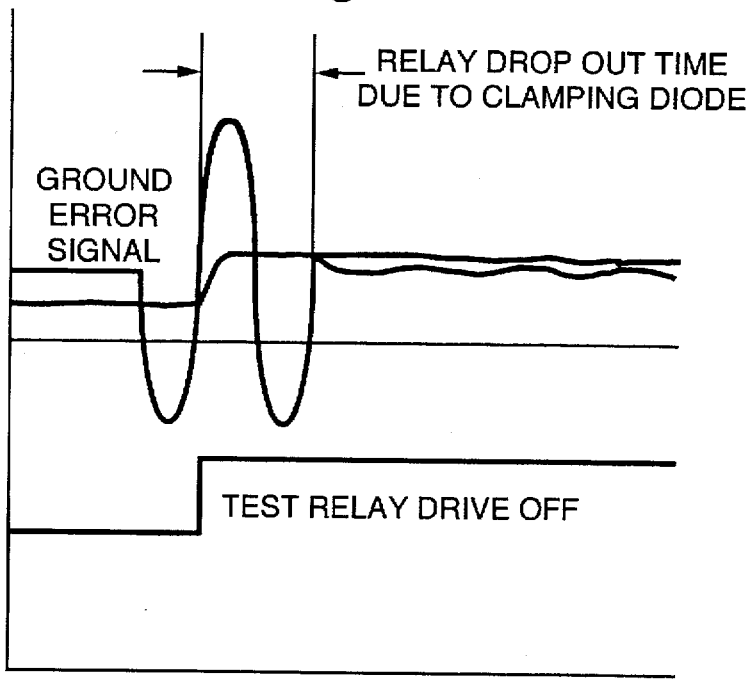
FIG. 5 shows test relay hold time due to coil voltage clamping by a diode in the safety ground detector of FIG. 1.
Figure 6:
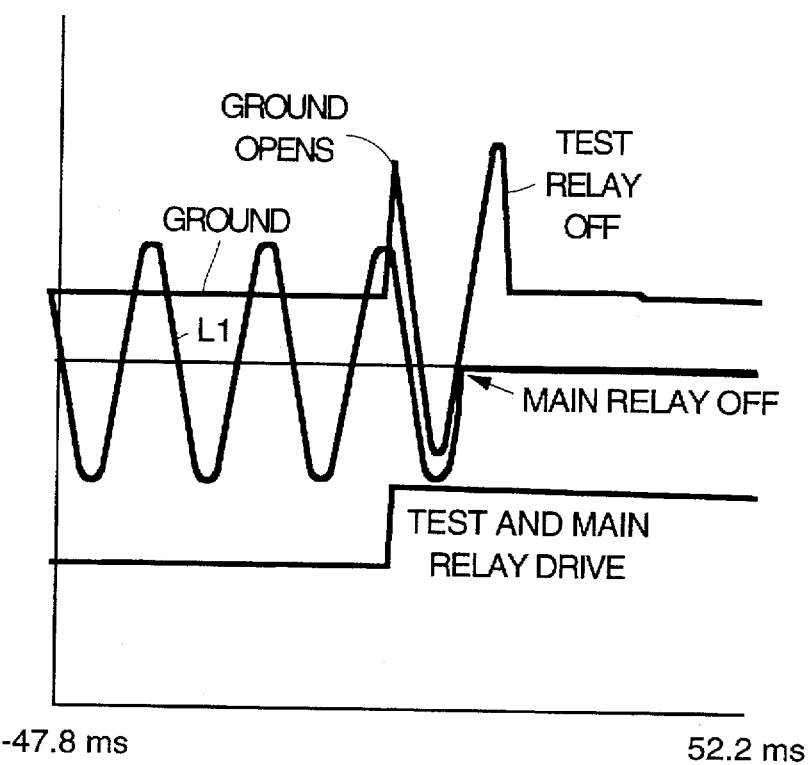
FIG. 6 shows response time to ground fault occurring after a unit has been powered up.

Test results are illustrated in FIGS. 2–6. FIG. 2 shows a normal power on sequence (no fault) for the safety ground detector 10. FIG. 3 shows measurement stabilization delays and test relay turn-on delays. FIG. 4 shows turn on of the safety ground detector 10 with an open ground condition, and wherein the test relay 11 is on approximately 30 milliseconds and shuts off due to a fault. FIG. 5 shows test relay hold time due to a coil voltage clamping diode across the main power relay 30. FIG. 6 shows response time to ground fault occurring after a piece of equipment has been powered up.

The safety ground detector was also tested in conjunction with charging of an electric vehicle with the safety ground detector 10 placed between the vehicle internal charging system and both a 120 V outlet and a 208 V outlet. In both cases charging was allowed when ground was present and prevented charging when the ground was open.

Thus, a safety ground detector that automatically detects ground continuity between a device and earth ground has been disclosed. It is to be understood that the above-described embodiment is merely illustrative of some of the many specific embodiments which represent applications of the principles of the present invention. Clearly, numerous and varied other arrangements may be readily devised by those skilled in the art without departing from the scope of the invention.

The embodiments of the invention in which an exclusive property or privilege is claimed are defined as follows:

1. Ground detection apparatus for determining the continuity of a safety ground of a piece of equipment, said apparatus comprising:

test relay circuitry for determining if a ground connection is open, including a test relay for receiving first and second line input signals, where the first line input signal corresponds to a hot input, and the second line input signal corresponds to a hot input for 208 or 240 VAC or a neutral input for 120 VAC and first and second dividers having respective first inputs coupled to the first and second line input signals through the test relay and having respective second inputs coupled by way of first and second unequal high value resistors for receiving a ground input; and comparison logic circuitry coupled to the test relay circuitry for generating a fault signal if the ground connection is open and to prevent the electrical equipment from being energized;

delay circuitry for stabilizing input voltage measurements, and testing the lines for a desired time period; and latching circuitry coupled to the test relay circuitry and the delay circuitry for latching the fault condition, and ensuring that all delays have elapsed and no fault condition exists before the electrical equipment is energized.

2. The apparatus of claim 1 wherein the comparison logic circuitry comprises:

a differential amplifier coupled to outputs of the first and second dividers;

a first comparator having a first input coupled to an output of the first divider and having a second input coupled to a first voltage reference for detecting an abnormally low input voltage;

a second comparator having a first input coupled to an output of the second divider and having a second input coupled to a second voltage reference for detecting an open ground connection based on a deviation between ground and the neutral input of a 120 VAC input signal;

a full wave rectifier coupled to an output of the differential amplifier;

a third comparator having a first input coupled to an output of the full wave rectifier and having a second input coupled to a third voltage reference for detecting an open ground connection based on a deviation between the hot inputs of a 208 or 240 VAC input signal; and a first AND gate having inputs coupled to outputs of the second and third comparators and having an output connected to one input of an OR gate, and wherein a second input of the OR gate is coupled to the output of the first comparator.

3. The apparatus of claim 2 wherein the delay circuitry comprises:

a test turn on delay circuit coupled to receive a bias voltage, the test turn on delay circuit being coupled to one input of a second AND gate whose output is coupled to the test relay;

a low level test delay circuit coupled to the test turn on delay circuit; and a stabilization delay circuit coupled to the test turn on delay circuit having an output coupled to one input of a fourth AND gate and wherein a second input of the fourth AND gate is coupled to the output of the OR gate.

4. The apparatus of claim 3 wherein the latching circuitry comprises:

a third AND gate having a first input coupled to the output of the low level test delay circuit;

a clamping diode coupled across the inputs of the fourth AND gate; and an inverter coupled between the output of the fourth AND gate and a second input of the third AND gate.

5. The apparatus of claim 4 wherein the latching circuitry further comprises:

a switch for selectively coupling the output of the inverter and a reference voltage to an input of the second AND gate to selectively provide latching and non-latching states, respectively.

6. Ground detection apparatus comprising:

a bias supply for supplying power;

a test relay for receiving first and second line input signals, where the first line input signal corresponds to a hot input, and the second line input signal corresponds to a hot input for 208 or 240 VAC or a neutral input for 120 VAC;

first and second dividers having respective first inputs coupled to outputs of the test relay and having respective second inputs coupled by way of first and second unequal high value resistors for receiving a ground input and, while the ground connection;

a differential amplifier coupled to outputs of the first and second dividers;

a first comparator having a first input coupled to an output of the first divider and having a second input coupled to a 2.4 volt voltage source;

a second comparator having a first input coupled to an output of the second divider and having a second input coupled to a 0.14 volt voltage source;

a full wave rectifier coupled to an output of the differential amplifier;

a second comparator having a first input coupled to an output of the full wave rectifier and having a second input coupled to a 0.28 volt voltage source;

a first AND gate having inputs coupled to outputs of the second and third comparators and having an output coupled to one input of an OR gate, and wherein a second input of the OR gate is coupled to the output of the first comparator;

an indicator circuit coupled to the output of the OR gate for indicating the presence of a ground fault;

a test turn on delay circuit coupled to receive a bias voltage coupled to one input of a second AND gate whose output is coupled to the test relay;

a low level test delay circuit coupled to the test turn on delay circuit;

a stabilization delay circuit coupled to the test turn on delay circuit having an output coupled to one input of a fourth AND gate and wherein a second input of the fourth AND gate is coupled to the output of the OR gate;

a third AND gate having a first input coupled to the output of the low level test delay circuit;

a clamping diode coupled across the inputs of the fourth AND gate;

an inverter coupled to the output of the fourth AND gate; and a power relay coupled to a second input of the third AND gate.

7. The apparatus of claim 6 further comprising a switch that provides latching and non-latching states and wherein the output of the inverter is coupled to the latching input.

8. Control apparatus for coupling an AC supply voltage to a load, wherein said AC supply voltage includes first and second hot voltage lines, comprising:

ground continuity detection circuitry for detecting proper grounding of said AC supply voltage, including first and second dividers having respective inputs coupled to the first and second hot voltage lines though a test relay and having respective second inputs coupled to ground by way of first and second unequal high value resistors; a differential amplifier coupled to outputs of the first and second dividers; a full wave rectifier coupled to an output of the differential amplifier; and a comparator having a first input coupled to an output of the full wave rectifier and having a second input coupled to a voltage reference for detecting an open ground connection based on a predefined voltage deviation between said first and second hot voltage lines;

test circuitry effective when said AC supply voltage is connected to said control apparatus for coupling said AC supply voltage to said ground continuity detection circuitry;

a main power relay effective when activated to couple said AC supply voltage to said load; and logic circuitry effective at the expiration of a predetermined interval after the coupling of said AC supply voltage to said ground continuity detection circuitry to activate said main power relay if said ground continuity detection circuitry detects proper grounding of said AC supply voltage, and to disable activation of said main power relay if said ground continuity detection circuitry fails to detect proper grounding of said AC supply voltage.

9. Control apparatus for coupling an AC supply voltage to a load, wherein said AC supply voltage includes a hot voltage line and a neutral line, comprising:

ground continuity detection circuitry for detecting proper grounding of said AC supply voltage, including first and second dividers having respective inputs coupled to the hot voltage and neutral lines though a test relay and having respective second inputs coupled to ground by way of first and second unequal high value resistors; and a comparator having a first input coupled to an output of the second divider and having a second input coupled to a voltage reference for detecting an open ground connection based on a deviation between ground and the neutral lines;

test circuitry effective when said AC supply voltage is connected to said control apparatus for coupling said AC supply voltage to said ground continuity detection circuitry;

a main power relay effective when activated to couple said AC supply voltage to said load; and logic circuitry effective at the expiration of a predetermined interval after the coupling of said AC supply voltage to said ground continuity detection circuitry to activate said main power relay if said ground continuity detection circuitry detects proper grounding of said AC supply voltage, and to disable activation of said main power relay if said ground continuity detection circuitry fails to detect proper grounding of said AC supply voltage.

* * * * *